United States Patent [19]
Hopkins

[11] 3,938,231
[45] Feb. 17, 1976

[54] CENTER CUTTING END MILL
[75] Inventor: David Alan Hopkins, Detroit, Mich.
[73] Assignee: The Valeron Corporation, Detroit, Mich.
[22] Filed: Mar. 11, 1975
[21] Appl. No.: 557,397

[52] U.S. Cl.............. 29/103 A; 29/105 R; 408/186
[51] Int. Cl.²........................................... B26D 1/12
[58] Field of Search........ 29/103 A, 105 R; 408/186

[56] References Cited
UNITED STATES PATENTS

| | | | |
|---|---|---|---|
| 3,125,799 | 3/1964 | Bennett | 408/713 X |
| 3,158,922 | 12/1964 | Reese | 29/105 R |
| 3,514,828 | 6/1970 | Wale | 29/105 R |
| 3,540,323 | 11/1970 | Rishel | 408/186 |

FOREIGN PATENTS OR APPLICATIONS

| 896,644 | 2/1962 | United Kingdom | 29/103 A |
|---|---|---|---|

*Primary Examiner*—Leonidas Vlachos
*Attorney, Agent, or Firm*—Farley, Forster and Farley

[57] ABSTRACT

A center cutting indexable insert end mill which can be used for axial plunging in solid material or side cutting. The center cutting insert having corner radii is positioned with the axial center line of the tool shank intersecting the inner corner radius. A single square insert with side clearance angle having the cutting face located in a radial plane provides alternate active cutting edges for axial and/or radial feed; alternatively a second diametrically oppositely located identical insert located radially outward of the center cutting insert performs side and outermost axial cutting functions.

17 Claims, 6 Drawing Figures

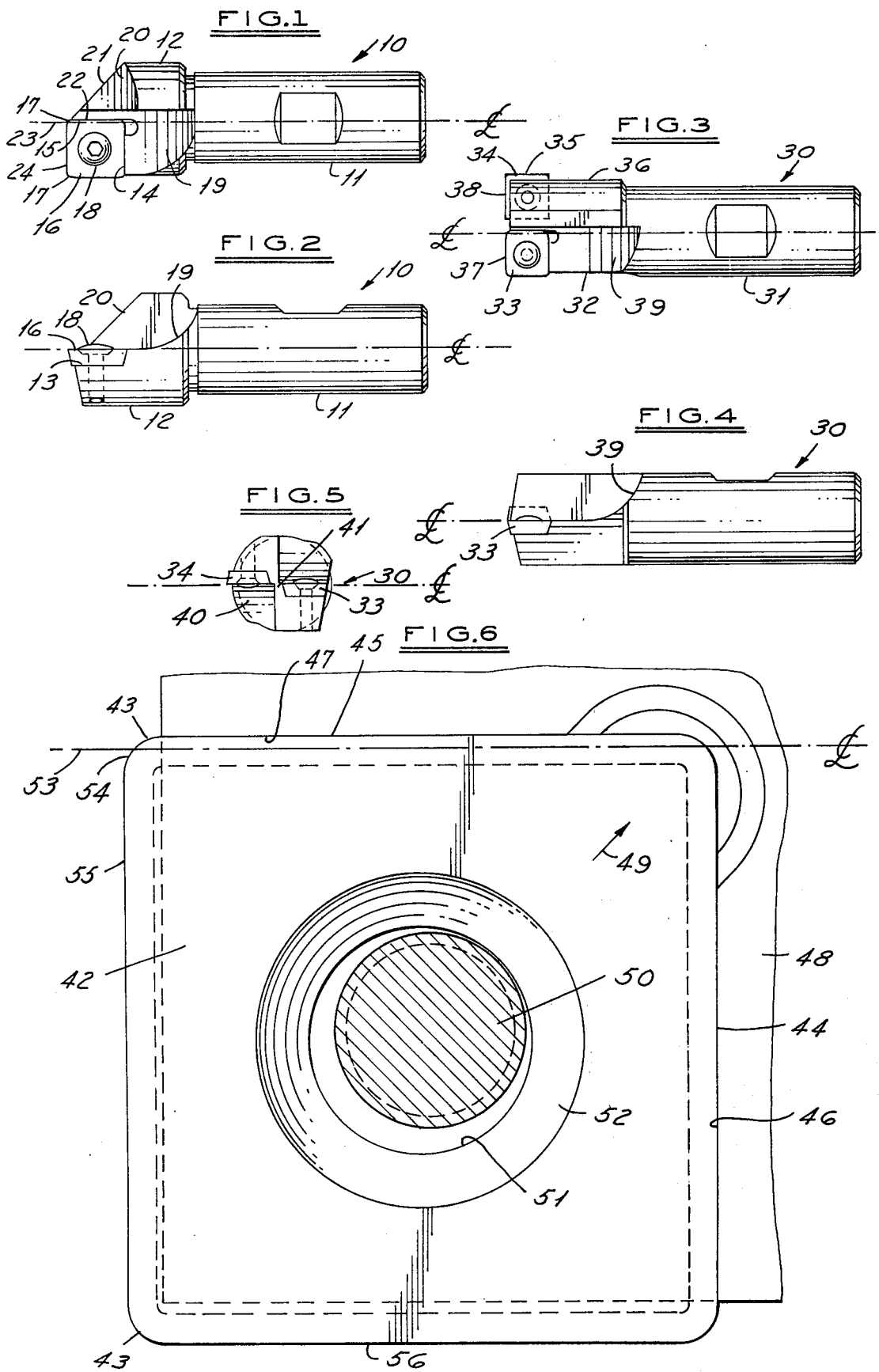

3,938,231

CENTER CUTTING END MILL

BACKGROUND OF THE INVENTION

Indexable inserts made with hard wear resistant material such as cemented tungsten carbide cannot be successfully provided with sharp square corners located on the axially centerline of a center cutting end mill since high pressure chip loading at the center with zero or near zero cutting speed results in immediate corner breakage; likewise, if the radial cutting edge extends over center so that the sharp cutting corner is moving backwards, the backward drag on the sharp corner results in immediate corner breakdown. Accordingly, indexable insert end mills have generally been confined in use to counterboring operations or to side cutting where the center corner problem is not critical or is entirely absent.

The most pertinent known prior art is as follows: U.S. Pat. Nos. 3,125,799, 3,540,323, 3,158,922.

SUMMARY OF THE PRESENT INVENTION

I have found by providing the conventional corner radius on a square positive rake tungsten carbide indexable insert and carefully locating the insert pocket in an end mill flute with zero degree radial rake, zero degree axial rake and zero degree lead angle, and with the inactive center cutting edge positioned slightly over center so that the axial center line intersects the corner radius, preferably in the range of the outer two-third of such radius, the cutting stress at and near such intersection of zero cutting speed is of a low order insufficient to damage the radiused cutting corner. The slight conical projection left at the center of a plunging cut of limited depth may be of no consequence or else may be readily removed by a simple secondary operation.

A single square indexable insert end mill cutter may be adapted for use in both plunging and side cutting; or by employing a second diametrically opposite identical insert spaced radially outward from the center cutting insert a range of exact standard diameters may be achieved with standard sized inserts by merely locating the radially outer pocket in appropriately stepped positions.

DESCRIPTION OF THE DRAWINGS

FIG. 1 is a plan view of a single insert center end and side cutting end mill in accordance with the present invention;

FIG. 2 is a side elevation of the end mill illustrated in FIG. 1;

FIG. 3 is a plan view of a double insert end mill in accordance with the present invention;

FIG. 4 is a side elevation of the end mill illustrated in FIG. 3;

FIG. 5 is a end elevation of such double insert end mill; and

FIG. 6 is an enlarged fragmentary view illustrating a pocket in an end mill with a square positive rake insert installed therein in accordance with the present invention.

DESCRIPTION OF THE PREFERRED EMBODIMENTS

With reference to FIGS. 1 and 2, an end mill 10 having a cylindrical shank 11 is provided with a fluted end 12 having a pocket with bottom 13 and side 14 and 15 locating surfaces for an indexable square insert 16 with side clearance angles (sometimes referred to in the art as positive rake inserts) having conventional radiused corners 17. The insert is held in the pocket by a conically tapered Allen head socket screw 18 positioned to engage a conically countersunk central hole in the insert and upon tightening to urge the insert against the bottom seat and angularly against both sidewalls 14 and 15 of the pocket. The adjacent inactive cutting edges of the insert extend slightly above the side locating walls 14 and 15 which terminate at the bottom of an arcuate extensive chip clearance wall 19 cut into the annular head 12 which is also relieved by a pair of angular planar cuts 20 and 21.

The inactive cutting edge 22 engaging the wall 15 of the pocket extends slightly over center beyond the axially centerline 23 of the end mill which, as more completely described hereafter in connection with FIG. 6, intersects the radiused corner 17 of the insert so that upon axially feeding of the end mill into a solid piece of stock the radially extending cutting edge 24 of the insert will cut a cylindrical hole having a planar end wall with corner radius corresponding to the insert and a slightly central conical projection corresponding to the radiused portion of the corner of the insert on the cutting side of the axial center line.

With reference to FIGS. 3, 4 and 5 illustrating the double insert version of the end mill 30, the cylindrical shank 31 is relieved slightly at 32 to accommodate a somewhat smaller insert 33 than illustrated in FIG. 1 which in other respects is located in a similar pocket having bottom and side locating walls adapted to position the insert for center cutting as in the case of the FIG. 1 embodiment. In this case the second indexable insert cutter 34 like the center cutting insert 33 has its cutting face located in a radial plane common to both inserts; but the second insert 34 is located at a radially outwardly displaced position relative to the insert 33 and the centerline of the end mill so that the radially outermost cutting edge 35 extends outside of the cylindrical head 36 and establishes the effective diameter of any axial plunging cut as well as the active cutting edge for any lateral side cut. The respective end cutting edges 37 and 38 are in alignment and equally active in the overlapping region during axial feed with the center portion cut solely by insert 33 and the outer circumferential extremity cut solely by insert 34. As best shown in FIG. 5 the radially offset location of the outermost insert 34 permits a chip clearance gash cut 39 associated with the insert 33 and 40 associated with the insert 34 to be provided without destroying an intermediate central web 41 which interconnects and strengthens the rigidity of the end mill.

Referring to FIG. 6 showing an enlarged view of a square "positive rake" insert 42 having radiused corners 43 with inactive sides 44 and 45 seated respectively against radially extending and axially extending pocket walls 46 and 47 in the end 48 of an end mill urged into corner location engagement by the clamping screw 50 extending through the insert and conical countersunk surface 52 engaged by the conical head of the clamping screw. A critical relationship exists between the location of the center cutting corner 43 and axial center line 53 which provides a key feature of the invention. The axially extending inactive cutting edge 45 is preferably located slightly over center relative to the axis 53 as shown in order to assure clean center cutting with only a slight uncut center conical projection at the bottom of any blind axial cut corresponding to the radiused portion 54 on the cutting side of the corner 43, such projection extending from the planar radial surface generated by the active cutting edge 55. Such small projection terminating in a point at the intersection of the axis 53 with the corner 43 provides insufficient edge loading on the insert to damage the corner and no resistance to the backward moving over center portion of the corner 43 which is in a clearance area of the axial cut. It is important that the axis 53 intersect the radiused corner 43 at a point radially inside of its tangency with the linear cutting edge 55, preferably within a radial range extending two-thirds of the corner radiused dimension from the inactive cutting edge 45 so that at least one-third of the radial dimension of the corner 43 lies on the cutting side 54 of the axis 53. The other limit of insert positioning, favors at least a slight over center location, i.e., in the order of 0.010 inch in the case of a normal range of corner radii in the order of 1/64 to 1/32 inch of an inch which provides satisfactory cutting operation with a feed rate in the order of 0.003 to 0.010 inch per revolution.

In the case of a single insert end mill such as illustrated in FIGS. 1 and 2, the edge 56 provides a second active cutting edge for side cutting so that the same tool is capable of plunging axially into solid material to any depth within the insert size followed by lateral side cut; or conversely to make a side cut within the depth of the insert followed by plunging cut to any additional depth.

Where a second insert is employed, as in the embodiment of FIGS. 3, 4 and 5, its radially outwardly displaced location will determine the diameter of the hole for axial plunging cuts and its radially outer edge corresponding to 56 will provide the active cutting edge for lateral side cuts. The only limitation for the extent of radial displacement of the second insert relative to the center cutting insert is that the end cutting edges 55 must overlap at the corner radii in order to provide a continuous planar end surface cut. Thus a range of cutting diameters may be readily provided employing two equal standard size inserts by providing a series of progressively increased radially outward pocket locations for the second insert.

While the preferred embodiments illustrated in the drawings show the inserts with zero degrees radial rake, zero degrees axial rake and zero degrees lead angle, it is possible to provide a pocket for the inner cutter inserts providing a positive or negative axial rake as for particularly soft or particularly tough materials; respectively, and likewise to provide the outer cutter with a positive or negative radial rake for like purposes; however, the employment of a positive rake insert with zero radial rake, axial rake and lead angle covers the broadest middle range of cutting requirements and is preferred for a standard line of end mills capable of side and end cutting to the center.

In order to insure a smooth clean "wiped" end surface in the case of a side cut made with double inserts, the radially outermost insert is preferably located 0.001 to 0.003 inch axially ahead of the inner so as to avoid any center ridge which might result from a tolerance error in attempting to locate both edges in the same radial plane. I claim:

1. An indexable insert center cutting end mill comprising;
    a shank,
    a pocket at one end of said shank formed for locating an indexable, polygonal insert,
    said pocket having wall means for locating said insert with a cutting edge extending radially, with an inactive radially innermost edge and with the axis of said end mill intersecting an intermediate briding corner joining said edges.

2. An end mill as set forth in claim 1 wherein said intersection occurs within the range of two-thirds of said corner measured radially from said inactive edge.

3. An end mill as set forth in claim 2 wherein said corner is arcuate.

4. An end mill as set forth in claim 3 wherein said arcuate corner is formed with a substantially constant radius arcuate tangent relative to said respective edges.

5. An end mill as set forth in claim 1 wherein said pocket is adapted for a square insert with side clearance angle.

6. An end mill as set forth in claim 5 adapted for lateral side cutting with the radially outermost cutting edge of said insert.

7. An end mill as set forth in claim 1 including a second pocket for a second indexable polygonal insert located radially outward and overlapping relative to said first named insert.

8. An end mill as set forth in claim 1 including conically headed screw means adapted to secure a conically countersunk centrally apertured insert in said pocket.

9. An end mill as set forth in claim 8 including a chip clearance relief extending axially rearwardly from said pocket and including an arcuate surface terminating at the outer perimeter of said end mill.

10. An end mill as set forth in claim 9 including a second pocket for a second diametrically opposed insert located radially outward relative to said first named insert, said second pocket having a relief clearance associated therewith similar to that for said first named pocket, and a solid web intermediate and extending substantially to the end extremities of said pockets.

11. An end mill as set forth in claim 1 adapted for locating an insert with zero degrees radial rake, zero degrees axial rake, and zero degrees lead angle.

12. An end mill as set forth in claim 4 wherein said corner radius is in the range of one sixty-fourth to one thirty-second of an inch.

13. An end mill as set forth in claim 12 wherein said radially innermost edge is in the order of 0.010 inch over center relative to the axis of said end mill.

14. An end mill as set forth in claim 1 including a square insert with a central conically countersunk aperture engaged by a conical headed screw installed therein.

15. An end mill as set forth in claim 7 including two identical square inserts each with a central conically countersunk aperture engaged by a conical headed screw installed therein.

16. An end mill as set forth in claim 7 wherein said radially outward insert is located axially slightly ahead of the inner insert to provide a clearly wiped surface in making lateral side cuts.

17. An end mill as set forth in claim 7 wherein said radially outward insert is located axially in the order of 0.001 to 0.003 inch ahead of the inner insert to provide a clearly wiped surface in making lateral side cuts.

* * * * *